United States Patent
Morishita

(10) Patent No.: US 7,054,783 B2
(45) Date of Patent: May 30, 2006

(54) ROTATIONAL SPEED DETECTOR WITH RIPPLE COMPENSATION

(75) Inventor: Mimpei Morishita, Fuchu (JP)

(73) Assignee: Toshiba Elevator Kabushiki Kaisha, Tokyo-To (JP)

( * ) Notice: Subject to any disclaimer, the term of this patent is extended or adjusted under 35 U.S.C. 154(b) by 0 days.

(21) Appl. No.: 10/488,922

(22) PCT Filed: Sep. 17, 2002

(86) PCT No.: PCT/JP02/09515

§ 371 (c)(1),
(2), (4) Date: Sep. 8, 2004

(87) PCT Pub. No.: WO03/025516

PCT Pub. Date: Mar. 27, 2003

(65) Prior Publication Data

US 2005/0033547 A1    Feb. 10, 2005

(30) Foreign Application Priority Data

Sep. 14, 2001    (JP) .............................. 2001-280030

(51) Int. Cl.
*G01P 3/00*    (2006.01)

(52) U.S. Cl. ...................... 702/147; 702/148

(58) Field of Classification Search .................. 702/41, 702/145, 147–148, 163, 194, 45
See application file for complete search history.

(56) References Cited

U.S. PATENT DOCUMENTS

| 4,240,020 A | * | 12/1980 | Okuyama et al. ........... 318/721 |
| 4,525,657 A | * | 6/1985 | Nakase et al. .............. 318/254 |
| 5,760,359 A | | 6/1998 | Nakano et al. ............. 318/603 |
| 6,230,110 B1 | * | 5/2001 | Iwazaki ...................... 702/148 |

FOREIGN PATENT DOCUMENTS

| JP | 63-179259 | 7/1988 |
| JP | 2-184286 | 7/1990 |
| JP | 2001-157477 | 6/2001 |

* cited by examiner

*Primary Examiner*—John Barlow
*Assistant Examiner*—Jonathan Moffat
(74) *Attorney, Agent, or Firm*—Oblon, Spivak, McClelland, Maier & Neustadt, P.C.

(57) ABSTRACT

The rotary detector according to this invention comprises a rotary detector unit C1, C1' which detects rotary motion of a rotor; and a rotary calculator unit C2, C2', C2" comprising a rotation angle detector, which detects the rotation angle of the rotor, and an angle speed detector 47 which detects the angle speed of the rotor, based on the output of the rotary detector unit. The rotary calculator unit comprises a trigonometrical calculator C3, C3', C3" which calculates a sine value or a cosine value of the rotation angle detected by the rotary detector; a gain adjuster 57, 57', 57" which multiplies the sine value or the cosine value, calculated by the trigonometrical calculator, by a predetermined gain; a multiplier 59, 59' which multiplies the output of the gain adjuster by the output of the angle speed detector; and a subtracter 61, 61' which subtracts the output of the multiplier from the output of the angle speed detector.

16 Claims, 9 Drawing Sheets

ROTATIONAL SPEED DETECTOR WITH RIPPLE COMPENSATION

This application is a 371 of PCT/JP02/095 15 filed Sep. 17, 2002 which claims benefit of Japanese patent 2001-280030 filed Sep. 14, 2001.

BACKGROUND OF THE INVENTION

1. Field of the Invention

The present invention relates to a rotary detector which can reduce the torque ripple of a rotor and the like by reducing the ripple component of an output signal.

2. Description of the Related Art

The output torque of a motor generally contains ripples. Since torque ripples are caused by speed irregularities and positional displacement of the support motor, they adversely affect the processing precision in, for example, an NC (numerical control) apparatus, and spoil the smoothness of an elevator ride by increasing carriage shaking.

When detecting this type of torque ripple, the torque ripple may be internal, arising in the motor main body comprising an accelerator, or external, arising in a rotary detecting sensor. Internal torque arises from the work precision of a motor stator and a rotor, eccentricity of the rotor bearing, a high-frequency magnetic field inside the motor, and the assembly precision of the decelerator. Many conventional methods have been proposed for reducing torque ripples of the former type. For example, Japanese Patent Application No. 7-129251 centers on the torque ripple generated by a decelerator, and calculates a correction signal Tcomp (=A·sin (θ+á1) where A is the torque ripple adjustment gain, θ is the angle of rotation of the decelerator, and á1 is the initial phase; in synchronism with the rotation cycle of the motor, this signal is fed forward and added to the target torque command, thereby canceling the torque ripple. Japanese Patent Application No. 11-299277 proposes storing the correlation between the torque ripple and the angle of rotation of the motor in a memory apparatus, reading a torque ripple corresponding to the angle of rotation of the motor, and creating a new torque command value by subtracting the ripple portion from the torque command value.

Since torque ripples of the latter type in the rotation detecting sensor mentioned above appear as motor torque ripples, the ripple problem can usually be reduced by applying a control method, such as the one described above, in the apparatus which controls the motor. However, when the ripples are caused by the angle of rotation being detected in the output value of the rotation detecting sensor, the amplitude of the ripples becomes larger in proportion to the detected angle speed, leading to a problem that it becomes impossible to increase the angle speed feedback gain when controlling the torque of the motor and the rotation speed; this places an enormous burden on the control apparatus and increases the cost of the apparatus.

In this way, a variety of control methods have been applied in the controller and driver of the rotating machine in conventional rotary detectors, in an attempt to ensure that a ripple in the output does not become a torque ripple and speed irregularities of the rotating machine which the rotary detector is installed in. For this reason, the controller and driver of the rotating machine become complex, lowering its reliability and increasing the cost. Furthermore, in addition to ripples in the output of the rotary detector, torque ripples in an electric motor include those generated by assembly precision of the decelerator, processing precision of the motor main body, high-frequency magnetic fields and the like, making it difficult to determine the cause of the ripples in the output of the rotary detector, and undermining its performance as a sensor.

The present invention has been realized based on the circumstances described above, and aims to provide a rotary detector which can reduce output ripples, eliminate torque ripples and speed irregularities of an actuator, such as a rotating machine, which the rotary detector is installed in, simplify the driver and controller of the actuator, reduce costs, and increase reliability.

In order to achieve the above objects, the rotary detector according to a first aspect of this invention comprises a rotary detector unit which detects rotary motion of a rotor; and a rotary calculator unit comprising a rotation angle detector, which detects the rotation angle of the rotor, and an angle speed detector which detects the angle speed of the rotor, based on the output of the rotary detector unit. The rotary calculator unit comprises a trigonometrical calculator which calculates a sine value or a cosine value of the rotation angle detected by the rotary detector; a gain adjuster which multiplies the sine value or the cosine value, calculated by the trigonometrical calculator, by a predetermined gain; a multiplier which multiplies the output of the gain adjuster by the output of the angle speed detector; and a subtracter which subtracts the output of the multiplier from the output of the angle speed detector.

According to a second aspect of the invention, in the rotary detector of the first aspect, the trigonometrical calculator comprises a phase adjuster which adjusts the phase of the rotation angle, detected by the rotation angle detector.

According to a third aspect of the invention, in the rotary detector of the first aspect, the rotary detector unit comprises a resolver which creates an output in accordance with the rotation angle of the rotor.

According to a fourth aspect of the invention, in the rotary detector of the first aspect, the rotary detector unit comprises a generator which outputs a voltage in accordance with the angle speed of the rotor.

According to a fifth aspect of the invention, in the rotary detector of the first aspect, the rotary detector unit comprises an encoder which creates an output in accordance with the rotation angle of the rotor.

According to a sixth aspect of the invention, in the rotary detector of the first aspect, the rotary detector unit is provided separate from the rotary calculator unit.

According to a seventh aspect of the invention, in the rotary detector of the first aspect, the rotary detector unit houses the rotary calculator unit.

According to an eighth aspect of the invention, in the rotary detector of the first aspect, the rotary calculator unit comprises a unit for reducing a ripple component of the angle speed.

According to a ninth aspect of the invention, in the rotary detector of the first aspect, the rotary calculator unit calculates an angle speed $\omega_{out}$ by calculating $$\omega_{out}=\omega(1-G\cdot\sin(n\theta+\Psi))$$

where θ represents the rotation angle, G represents the gain of the gain adjuster, Ψ represents the adjust phase value of the phase adjuster, and n represents the number of ripple cycles in the output of the rotary angle detector in one rotation of the rotor.

According to a tenth aspect of the invention, in the rotary detector of the first aspect, the rotary calculator unit comprises a unit for reducing a ripple component of the rotation angle.

According to an eleventh aspect of the invention, in the rotary detector of the first aspect, the rotation angle detector comprises an integrator which obtains a rotation angle by integrating the output of the angle speed detector.

According to a twelfth aspect of the invention, in the rotary detector of the first aspect, the rotary calculator unit comprises an integrator for integrating the angle speed output $\omega_{out}$.

According to a thirteenth aspect of the invention, in the rotary detector of the first aspect, the rotary calculator unit outputs a rotation angle signal which reduces the ripple component of the rotation angle, and an angle speed signal which reduces the ripple component of the angle speed.

According to a fourteenth aspect of the invention, in the rotary detector of the first aspect, the rotary calculator unit is provided in series in a plurality of levels.

According to a fifteenth aspect of the invention, in the rotary detector of the second aspect, the phase adjuster has a plurality of adjust phase values, and selectively outputs one of the plurality of adjust phase values in accordance with a direction of the torque acting on the rotor.

According to a sixteenth aspect of the invention, in the rotary detector of the first aspect, the gain adjuster varies the predetermined gain in accordance with external power in the gravitational direction acting on the rotor rotation axis of the rotor.

Principles

This invention can effectively eliminate the ripple component in the output of a rotary detector unit, and particularly the ripple component which is dependent on the rotation cycle of the device being measured. When the output of the rotary detector unit contains a plurality of ripple components, all the ripple components can effectively be eliminated by provided a plurality of rotary calculators in correspondence with the ripples. That is, when $\theta_o$ represents the rotation angle of the device being detected, the output of a rotary detector unit having a ripple with an amplitude of a is converted by a rotation angle detector to the rotation angle output $\theta$ of the following equation.

$$\theta = \theta_o - a \cdot \cos(n\theta_o + \phi) \quad (2)$$

where n represents the number of ripple cycles in one rotation of the device being detected, and $\phi$ represents the initial phase difference when attaching the rotary detector unit to the device being detected.

In the present invention, for example, when an angle speed detector time-differentiates the rotation angle output $\theta$, the following angle speed output $\omega$ is obtained.

$$\omega = d\theta_o/dt(1 + a \cdot n \cdot \sin(n\theta_o + \phi)) \quad (3)$$

When a rotary calculator unit calculates the output $\omega_{out}$ of the unit based, for example, on equation (1), the output $\omega_{out}$ is expressed by substituting equations (2) and (3) for equation (1) as follows $$\omega_{out} = \quad (4)$$
$$d\theta_o/dt(1 - G \cdot \sin(\Psi - a \cdot n \cdot \cos(n\theta_o + \phi) + n\theta_o) + a \cdot n \cdot \sin(n\theta_o + \phi) - a \cdot n \cdot G \cdot \sin(\Psi - a \cdot n \cdot \cos(n\theta_o + \phi) + n\theta_o)\sin(n\theta_o + \phi))$$

Here, $d\theta_o/dt$ represents the angle speed of the device being detected.

In equation (4), since the ripple amplitude is generally small so that a <<1, when a trigonometrical function is developed in a near-linear form near an angle of zero, the equation becomes $$\omega_{out} = d\theta_0/dt(1 - G \cdot \sin(\Psi + n\theta_o) + \quad (5)$$
$$a \cdot n \cdot G \cdot \cos(\Psi + n\theta_o)\cos(n\theta_o + \phi) + a \cdot n \cdot \sin(n\theta_o + \phi) - a \cdot n \cdot G \cdot \sin(\Psi - a \cdot n \cdot \cos(n\theta_o + \phi) + n\theta_o)\sin(n\theta_o + \phi))$$

Assuming $a \cdot G = 0$, then $$\omega_{out} = d\theta_o/dt(1 - G \cdot \sin(n\theta_o + \Psi) + a \cdot n \cdot \sin(n\theta_o + \phi)) \quad (6)$$

Equation (6) shows that, when the gain G of in equation (1) can be set equal to the proportion of ripples a·n, and the adjust phase $\Psi$ can be set equal to the initial phase difference $\phi$, the output $\omega_{out}$ of the rotary calculator unit is equal to the angle speed $d\theta_o/dt$ of the detected device, and the ripple component in the output of the rotation angle detector unit can be eliminated.

Furthermore, error between the output $\omega_{out}$ of the rotary calculator unit and the angle speed $d\theta_o/dt$ can be determined from Equation (6) as $$e_{rr} = \omega - d\theta_o/dt = (a \cdot n \cdot \sin(n\theta_o + \phi) - G \cdot \sin(n\theta_o + \Psi))d\theta_o/dt \quad (7)$$

which can be expanded to $$e_{rr} = d\theta_o/dt\sqrt{(a^2n^2 + G^2 - 2anG\cos(\psi - \phi))} \times \quad (8)$$
$$\sin\left(n\theta_o + \phi - \tan^{-1}\frac{G\sin(\psi - \phi)}{an - G\cos(\psi - \phi)}\right)$$

The amplitude of the error err is a concave function having its only minimum point at zero with respect to, for example, a gain G of between 0 to 2 an, and an adjust phase $\Psi$ of between $-\pi+\phi+$ to $\pi+\phi+$; the minimum value of zero can easily be determined from appropriate values for G and $\Psi$. When the proportion of ripples an and the initial phase $\phi$ are known in advance, G and $\Psi$ should of course be set to their known values from the start.

In this way, the present invention is able to reduce the output ripples of a rotary detector, and can also reduce torque ripples and speed irregularities in an actuator such as a rotor, which the rotary detector is installed in. Further, since the output ripple can be determined by the simple computation of Equation (1), the drive device and control device for the actuator can be simplified and cost can be lowered. As is clear from Equation (8), when the amplitude of the error err is zero, the ripple component can be reduced irrespective of the rotation speed of the detected device, increasing the precision and reliability of the rotary detector.

DESCRIPTION OF THE PREFERRED EMBODIMENTS

Embodiments of the present invention will be explained in detail with reference to the accompanying drawings.

Embodiment 1

A first embodiment of this invention will be explained with reference to FIGS. 1 to 7.

Figure 1:
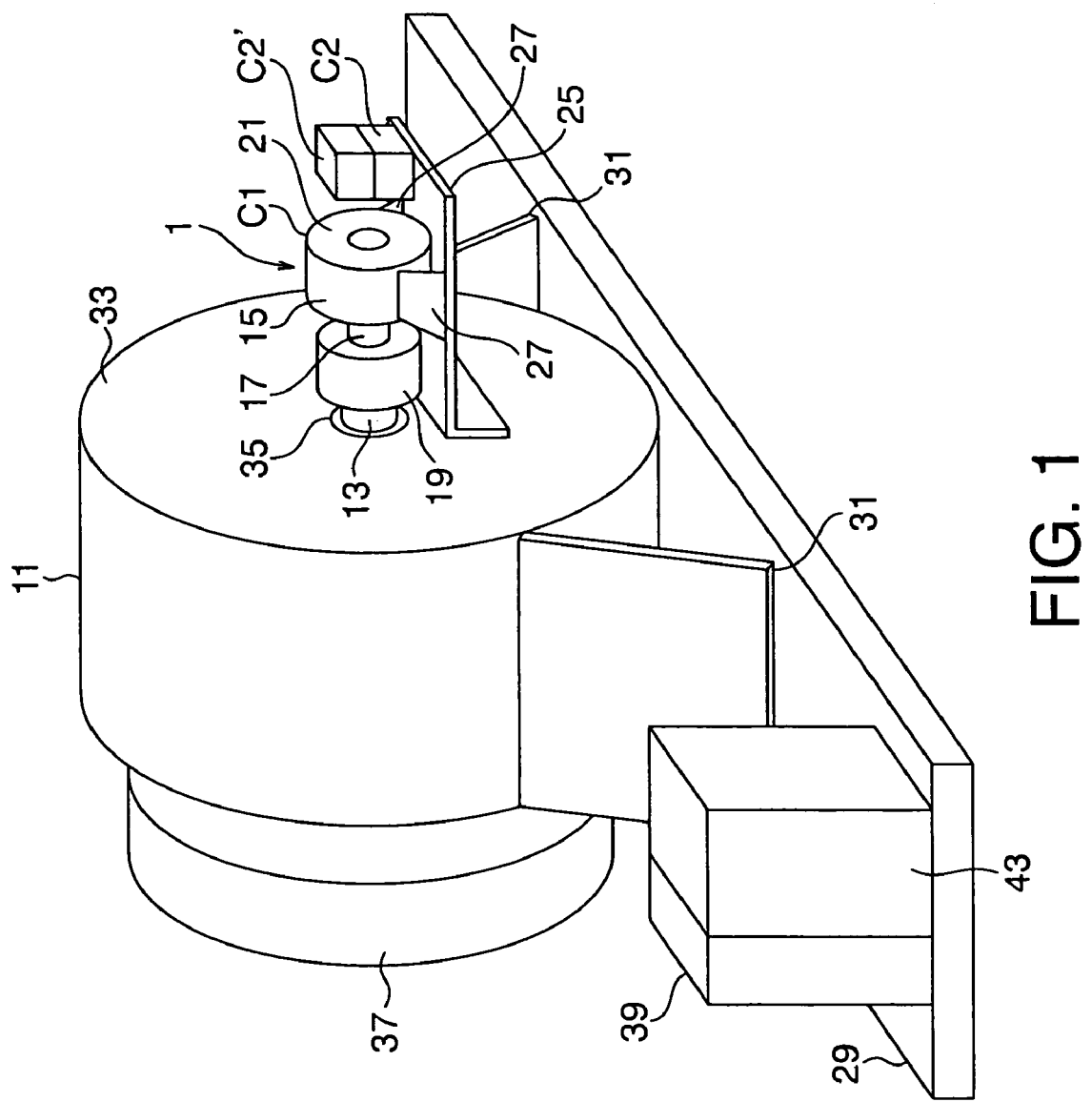
FIG. 1 is a perspective view of the overall constitution of a first embodiment of this invention.
Figure 2:
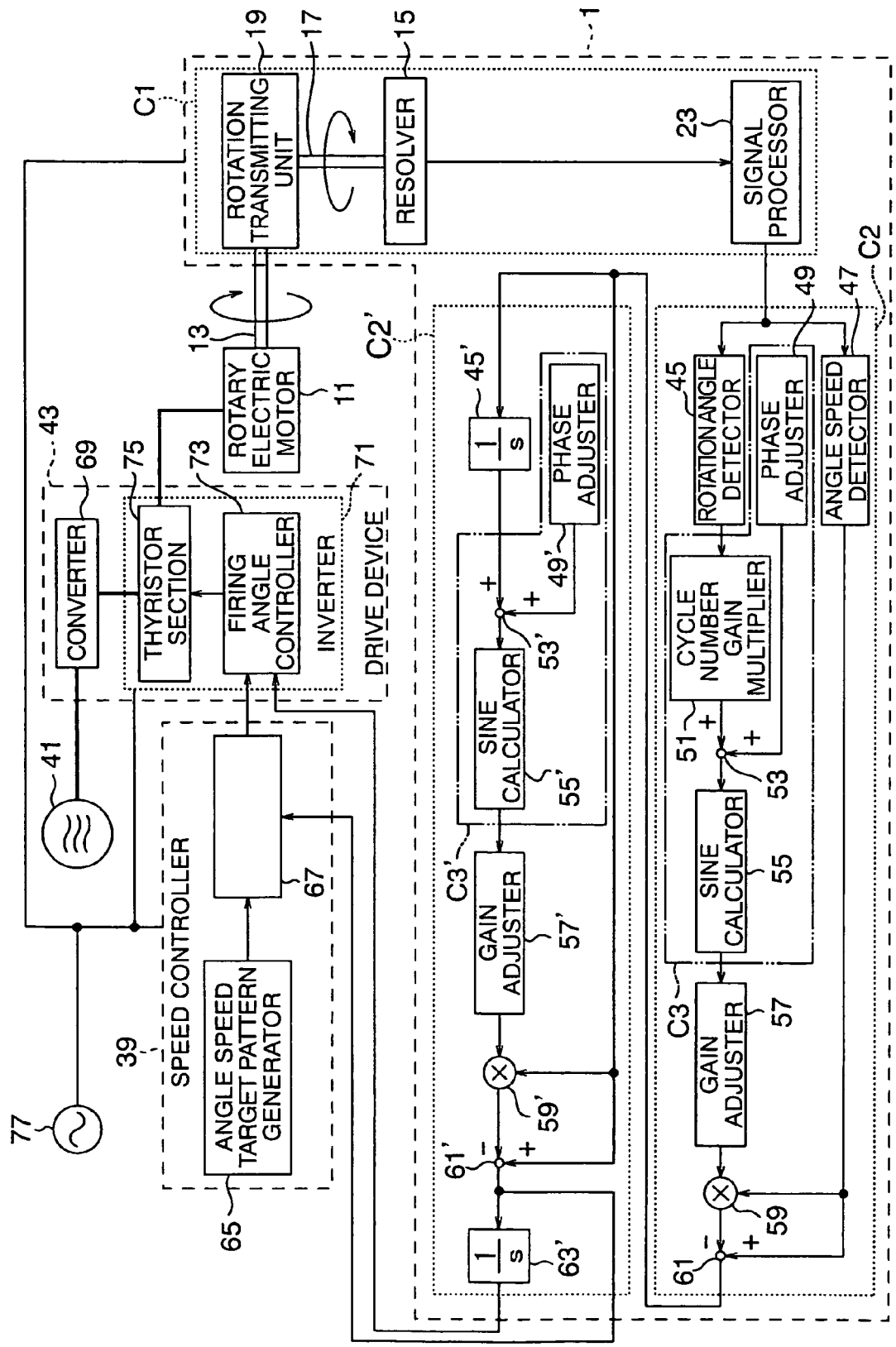
FIG. 2 is a block diagram showing the overall constitution of the first embodiment.

In FIGS. 1 and 2, reference code 1 represents the overall rotary detector in a first embodiment. The rotary detector 1 comprises a rotary detector unit C1, and rotary calculator units C2 and C2'.

The rotary detector unit C1 of this embodiment is attached to the device being detected, here comprising a rotor rotating axis 13 of a rotary electric motor 11, and comprises a resolver 15 which outputs a voltage proportionate to the rotation angle of the rotor rotation axis 13, a rotation input axis 17 which is directly connected to an unillustrated rotor of the resolver 15, and a rotation transmitting unit 19 which connects to the rotor rotation axis 13 and transmits rotations of the rotor rotation axis 13 to the rotation input axis 17 of the resolver 15.

The rotation transmitting unit 19 comprises, for example, a universal joint and a coupler, and the rotation input axis 17 of the resolver 15 ideally rotates around an axis core which matches that the rotor rotation axis 13. The resolver 15 comprises an unillustrated rotor which a winding is wound around and a stater 21 having a similar winding; in addition, the resolver 15 comprises a signal processor 23 which outputs a voltage corresponding to the rotation angle of each rotation angle of 0 to $2\pi$ (rad) of the rotation input axis 17 from a predetermined point of origin, e.g. a voltage of 0 to 5 V. The stater 21 of the resolver 15 is secured on a board 25 by a supporting member 27 using a predetermined method.

The device being detected, in this case the rotary electric motor 11, will be explained. The rotary electric motor 11 is secured by stoppers 31, mounted on a base 29, and as a result becomes one piece with the base 29. In addition to the rotor rotation axis 13, the rotary electric motor 11 comprises a stater housing 33 which houses the stater of the rotary electric motor 11, a bearing 35 which can rotatably support the rotor rotation axis 13 at the cylindrical bottom face center portion of the 33, a pulley 37 which is attached to the output side of the rotor rotation axis 13 and transmits power to the negative load of the rotary electric motor 11 by an unillustrated predetermined method, a speed control device 39 which calculates a torque command value for controlling the rotation speed of the rotor rotation axis 13 based on the output of the rotary detector 1, and a drive device 43 which is electrically powered by a three-phase alternating power 41 and, based on the output of the speed control device 39, generates a torque equivalent to the torque command value for the rotor rotation axis 13.

The output signal of the rotary detector unit C1 is input to the rotary calculator unit C2. This output signal contains a first ripple component, which fluctuates at the rotation cycle of the rotor rotation axis 13 and is caused by installation displacement differences and the like of the rotation transmitting unit 19, and a second ripple component, which fluctuates at an integral multiple (e.g. four) of the rotation cycle of the rotor rotation axis 13 and is caused by electromagnetic action of the uneven wind of the unillustrated winding of the resolver 15. The rotary calculator unit C2 and rotary calculator unit C2' are provided in order to reduce these ripples and obtain signals which correspond accurately to the detected rotation angle. The rotary calculator unit C2 comprises a rotation angle detector 45 which converts the signal output from the signal processor 23 to a rotation angle signal of the rotor rotation axis 13, an angle speed detector 47 which converts the rotation angle signal to an angle speed signal of the rotor rotation axis 13, a phase adjuster 49 which adjusts a phase angle with respect to the output signal of the rotation angle detector 45, a cycle number gain multiplier 51 which multiples the number of cycles of ripples to be eliminated from the output of the rotation angle detector 45 in one rotation of the rotor rotation axis 13 (e.g. four) by an input signal, an adder 53 which adds the output of the phase adjuster 49 to the output of the cycle number gain multiplier 51, a sine calculator 55 which inputs the output from the adder 53 and calculates a sine value of the input value, a gain adjuster 57 which multiplies the output of the sine calculator 55 by an adjustable gain, a multiplier 59 which multiplies the output of the gain adjuster 57 by the output of the angle speed detector 47, and a subtracter 61 which subtracts the output of the multiplier 59 from the output of the angle speed detector 47. The phase adjuster 49, the cycle number gain multiplier 51, the adder 53, and the sine calculator 55 together form a trigonometrical calculator C3.

The rotary calculator unit C2' comprises a rotation angle detector 45' as an integrator which integrates the angle speed comprising the output of the rotary calculator unit C2, a phase adjuster 49' which adjusts a phase angle with respect to the output signal of the rotation angle detector 45', an adder 53' which adds the output of the phase adjuster 49' to the output of the rotation angle detector 45', a sine calculator 55' which inputs the output from the adder 53' and calculates a sine value of the input value, a gain adjuster 57' which multiplies the output of the sine calculator 55' by an adjustable gain, a multiplier 59' which multiplies the output of the gain adjuster 57' by the output of the rotary calculator unit C2, and a subtracter 61' which subtracts the output of the multiplier 59' from the output of the rotary calculator unit C2, and an integrator 63' which integrates the angle speed comprising the output of the subtracter 61'. The phase adjuster 49', the adder 53', and the sine calculator 55' together form a trigonometrical calculator C3'.

To facilitate understanding, the speed control device 39 and the drive device 43 will be explained. The speed control device 39 comprises an angle speed target pattern generator 65 which outputs an angle speed target pattern to be followed by the angle speed of the rotor rotation axis 13, and a torque command calculator 67 which calculates a torque command value for the rotation speed of the rotor rotation axis 13 to chase the target pattern at, based on the output of the angle speed target pattern generator 65 and the angle speed output of the subtracter 61' of the rotary calculator unit C2'. The drive device 43 comprises a converter 69 which converts ac power from the three-phase alternating power 41 to dc power, and an inverter 71 which inputs the dc power from the converter 69 and outputs a predetermined three-phase ac power such that the rotary electric motor 11 generates a torque which is equivalent to the torque command value, based on the output of the torque command calculator 67 and the output of the integrator 63'. The inverter 71 comprises a firing angle controller 73 which controls a thyristor firing angle based on the outputs of the torque command calculator 67 and the integrator 63' so that a three-phase ac current for generating the desired torque is supplied to the rotary electric motor 11, and a thyristor section 75 which supplies the three-phase ac current to the rotary electric motor 11 in compliance with the output from the firing angle controller 73.

In the rotary detector 1, the speed control device 39, and the drive device 43, the power needed for the operations of these devices is supplied from a single-phase ac power 77. Incidentally, in the block diagrams below, the arrow lines represent signal paths, and the solid lines present power paths near the rotary electric motor 11 and the rotary detector 1.

Subsequently, the operation of the rotary detector according to the embodiment described above will be explained.

When the device is in standby (that is, when the three-phase alternating power 41 and the single-phase ac power 77 are injected and the rotary detector 1, the speed control device 39, and the drive device 43 are in operation status but the angle speed target pattern generator 65 is outputting zero), the rotor rotation axis 13 maintains an angle speed of zero. Eventually, when the angle speed target pattern generator 65 generates a mount-shaped pattern, such as that shown for example in FIG. 3, and the target angle speed starts to increase, the torque command calculator 67 calculates the torque command value to be generated by the rotary electric motor 11 based on the present angle speed of the rotor rotation axis 13 output from the subtracter 61' and the angle speed target value of the angle speed target pattern generator 65, and the calculated result is output to the drive device 43. Then, the firing angle controller 73 controls the firing angle to the j75 so that the rotary electric motor 11 generates the torque specified by the command value, and the output current of the inverter 71 rotates the rotary electric motor 11 at a predetermined rotation speed at the torque specified by the command value. In this way, the torque generated by the rotary electric motor 11 starts to rotate the pulley 37 and the rotor rotation axis 13.

The rotation of the rotor rotation axis 13 is transmitted via the rotation transmitting unit 19 and the rotation input axis 17 to the resolver 15, and the output voltage at the signal processor 23 increases in correspondence with the increase in the rotation angle of the rotor rotation axis 13. Based on the output voltage of the signal processor 23, the rotation angle detector 45 detects the rotation angle of the rotor rotation axis 13, and the angle speed detector 47 detects the angle speed via, for example, a differentiator or the like. At this time, the output voltage of the signal processor 23 contains a first ripple and a second ripple for the reasons described above.

With respect to the rotation angle obtained by the rotation angle detector 45, the cycle number gain multiplier 51 multiplies the number of ripple cycles in one rotation of the rotor rotation axis 13 by, in this example, four, and the adder 53 adds to this the predetermined phase angle of the phase adjuster 49 and inputs it to the sine calculator 55, which calculates a sine value of the value output from the adder 53.

The gain adjuster 57 multiplies the output of the sine calculator 55 by a predetermined gain, and the multiplier 59 multiplies the output of the gain adjuster 57 by the angle speed from the angle speed detector 47. The output of the multiplier 59 and the angle speed from the angle speed detector 47 are applied to the subtracter 61, which subtracts the output of the multiplier 59 from the output of the angle speed detector 47; the result becomes the output of the rotary calculator unit C2. That is, with respect to the rotation angle and angle speed of the rotor rotation axis 13, the result calculated in the equation (1) is output from the rotary calculator unit C2 as the angle speed. Therefore, the second ripple component is eliminated at the angle speed output from the rotary calculator unit C2.

The angle speed output from the rotary calculator unit C2 is then input to the rotary calculator unit C2'. Here, the rotation angle detector 45' comprising the integrator integrates the angle speed and converts it to a rotation angle. The phase adjuster 49' obtains a predetermined phase angle corresponding to the initial phase angle of the first ripple component, and the rotation angle detector 45' and the phase adjuster 49' both output to the adder 53'. The cycle number gain multiplier 51, provided between the rotation angle detector 45' and the adder 53', is not provided in the rotary calculator unit C2 because the first ripple component to be eliminated is in synchronism with the rotor axis of rotation. The sine calculator 55' calculates a sine value for the rotation angle output by the adder 53', and the gain adjuster 57' multiplies the value output from the sine calculator 55' by a predetermined gain, corresponding to the amplitude of the first ripple component. The multiplier 59' multiplies the output from the gain adjuster 57' by the angle speed output from the rotary calculator unit C2, and the subtracter 61' subtracts the output of the multiplier 59' from the angle speed output from the rotary calculator unit C2. That is, the result calculated in the first equation (1) is output from the subtracter 61' as the angle speed for the first ripple component. Therefore, all the ripple components are eliminated at the angle speed output from the subtracter 61'. The angle speed output from the subtracter 61' is applied as a first output of the rotary calculator unit C2' to the speed control device 39, and is applied to the integrator 63' and converted to a rotation angle. The rotation angle output of the integrator 63' is input to the drive device 43 as the output of the rotary calculator unit C2'. The rotation angle and angle speed of the rotor rotation axis 13 increase as the angle speed target value increases, and are input accurately to the torque command calculator 67 and the firing angle controller 73, so that no abnormal vibrations accompanying the increase in angle speed, or torque ripples when the angle speed is constant, are generated in the output of the rotary electric motor 11, and the pulley 37 rotates at an angle speed which closely follows the angle speed target pattern shown in FIG. 3. When the target angle speed eventually reaches zero, the angle speed of the pulley 37 also becomes zero, and the rotary electric motor 11 returns to standby status.

Figure 3:
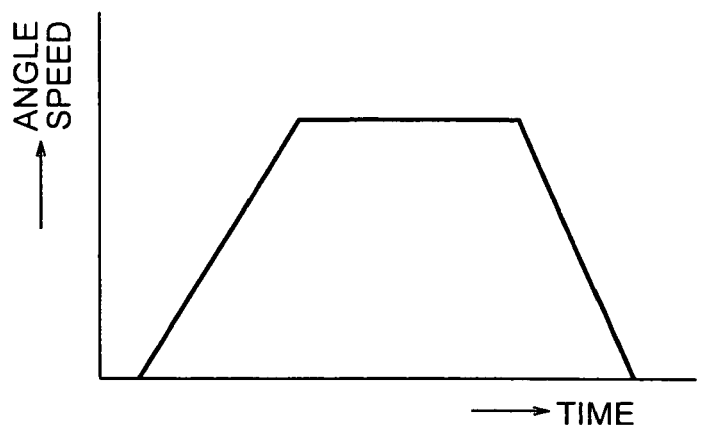
FIG. 3 is a pattern diagram showing the relationship between target angle speed and time in the first embodiment.
Figure 4:
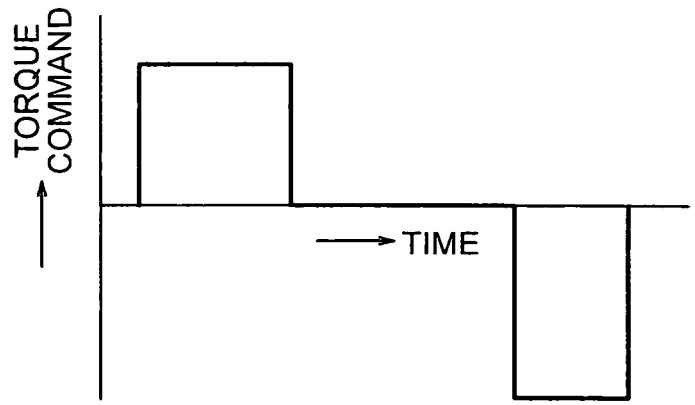
FIG. 4 is a pattern diagram showing the relationship between torque command value and time in the first embodiment.
Figure 5:
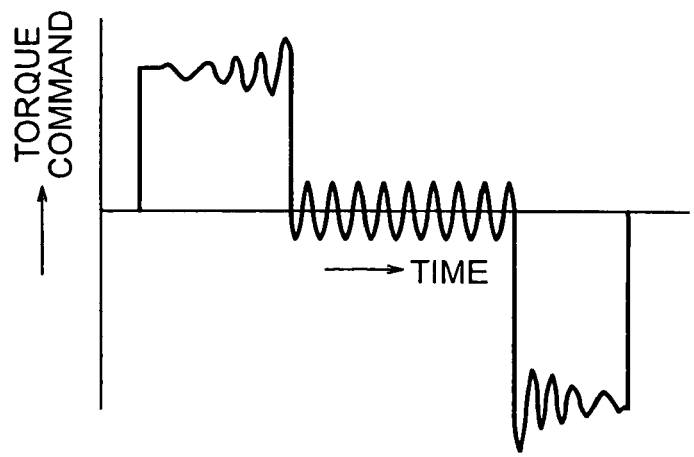
FIG. 5 is a pattern diagram showing the relationship between torque command value and time in a conventional device.
Figure 6:
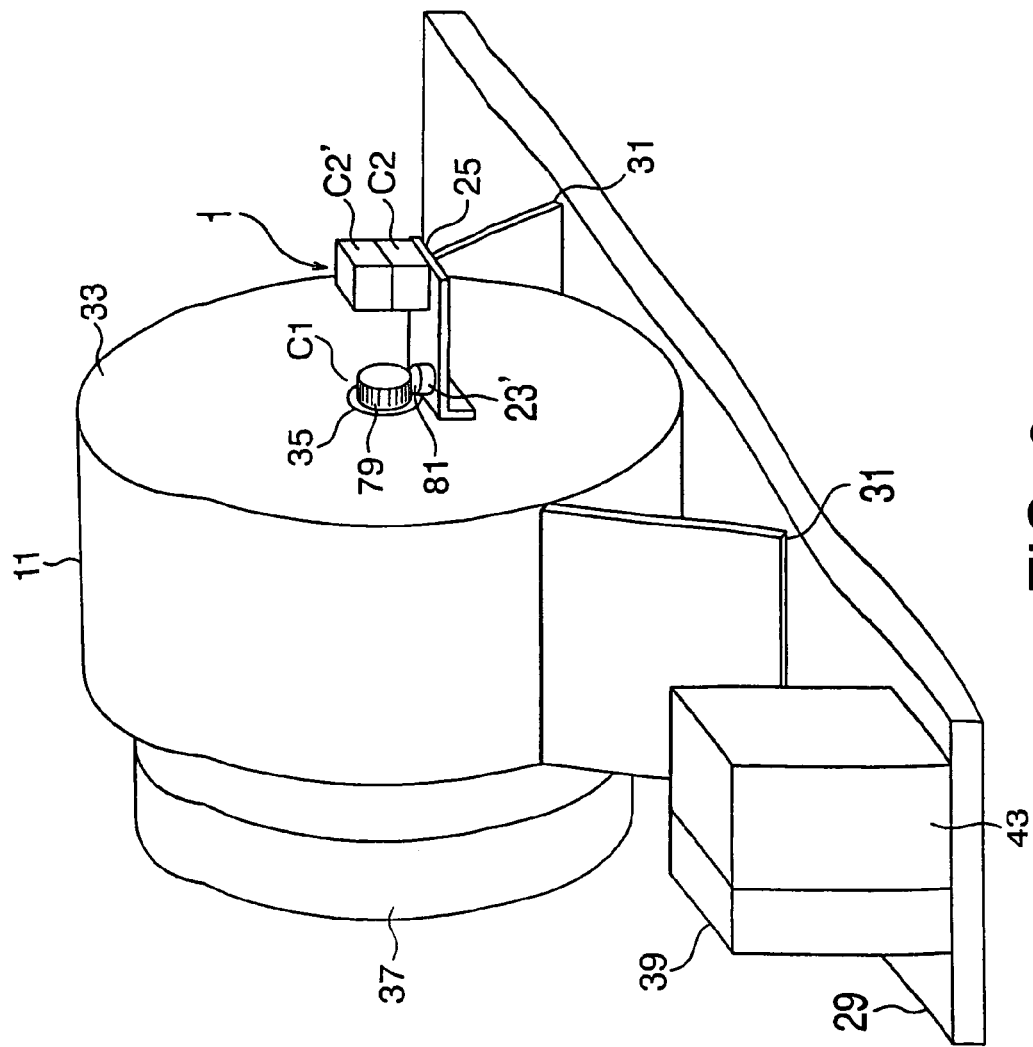
FIG. 6 is a perspective view showing a modification of the rotary detector in the first embodiment.

In this case, the torque command value of the torque command calculator 67 has the waveform shown in FIG. 4 (corresponding to the differential value of the speed pattern of FIG. 3), but when the rotation information of the rotor rotation axis 13 is input directly from the rotary detector unit C1 to the speed control device 39 as in a conventional apparatus, as the angle speed of FIG. 3 increases, ripples are generated in the torque command, as shown in FIG. 5. The frequency and amplitude of the ripples increase until the angle speed of the rotor rotation axis 13 has increased to its maximum, and disappear as the angle speed finally decreases. When there are ripples in the torque command from zero until the frequency when operating at maximum angle speed, resonance may be excited at a specific frequency in the system connected to the rotary electric motor 11. While resonance is being excited in the system, when the rotor rotation axis 13 reaches a specific angle speed, the system generates noise and vibrations which are potentially damaging to the system itself. To prevent this and increase the reliability of the system, the rigidity of the overall system comprising the rotary electric motor 11 is increased to raise the resonance frequency. However, since very strong materials and reinforcements are needed to increase the rigidity of the system, the result is an increase in the cost of the overall system connected to the rotary electric motor 11. In contrast, as shown in FIG. 4, this embodiment has no ripples in the torque, and consequently has no problem of increased cost.

Figure 7:
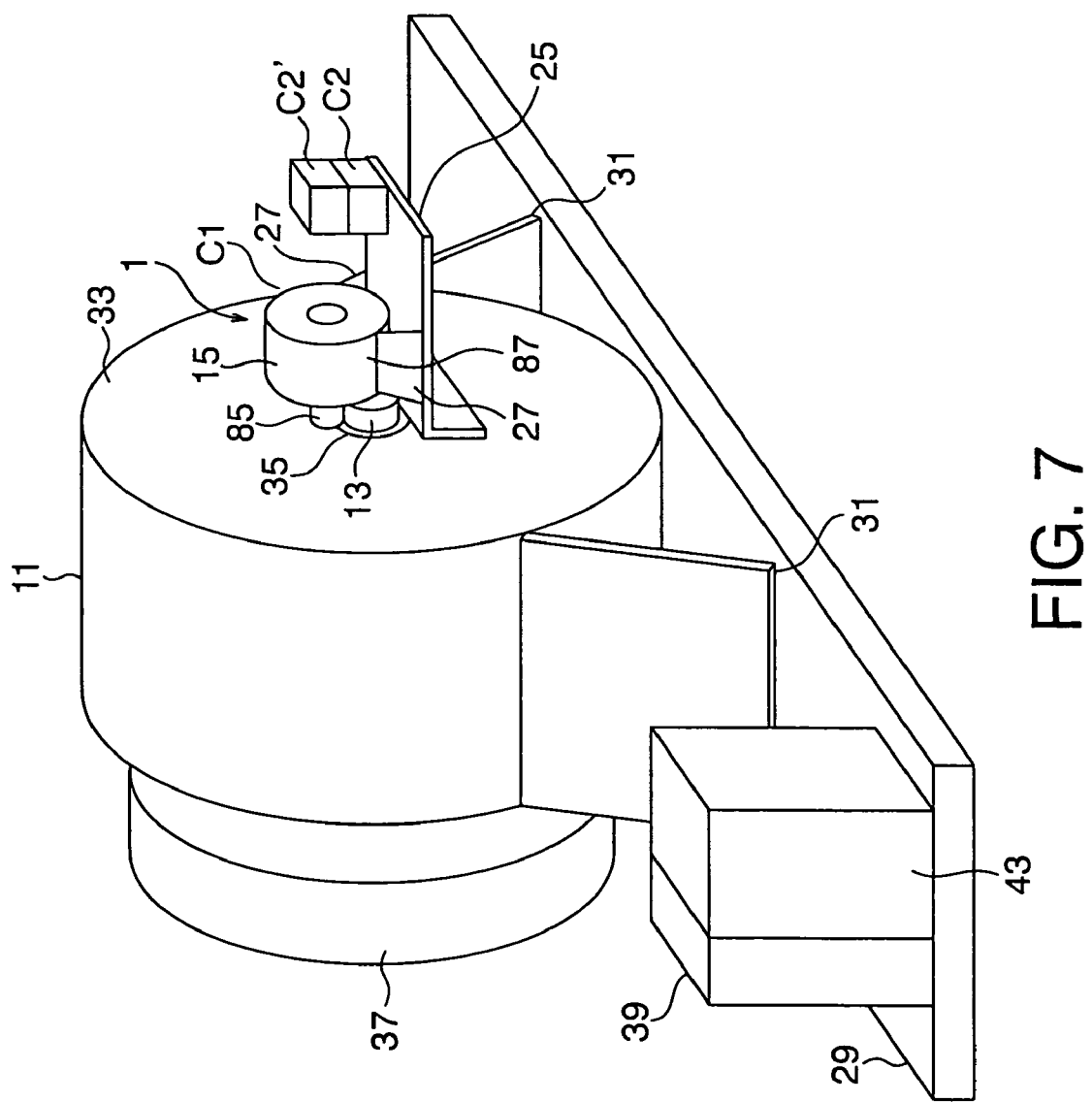
FIG. 7 is a perspective view showing another modification of the rotary detector in the first embodiment.

Incidentally, although rotary detector of the first embodiment comprises the resolver 15, there are no restrictions on its constitution and various modifications are possible. For example, a generator which obtains an output voltage proportionate to the angle speed of the rotation input axis 17 is equally acceptable. Furthermore, although the rotation of the rotary electric motor 11 is transmitted by the rotation transmitting unit 19 and the rotation input axis 17, this does not imply restriction to the use of the rotation transmitting unit 19 and the rotation input axis 17. As shown by way of example in FIG. 6, the rotary detector unit C1 may comprise an optical encoder 83 wherein a stripe pattern 79 at equal intervals is provided around the end of the rotor rotation axis 13, and is read by an optical element 81 contained in a signal processor 23'. Alternatively, as shown in FIG. 7, the rotation of the rotor rotation axis 13 can be transmitted to a rotary encoder via a rotation transmitting unit comprising a roller 85.

Embodiment 2

Figure 8:
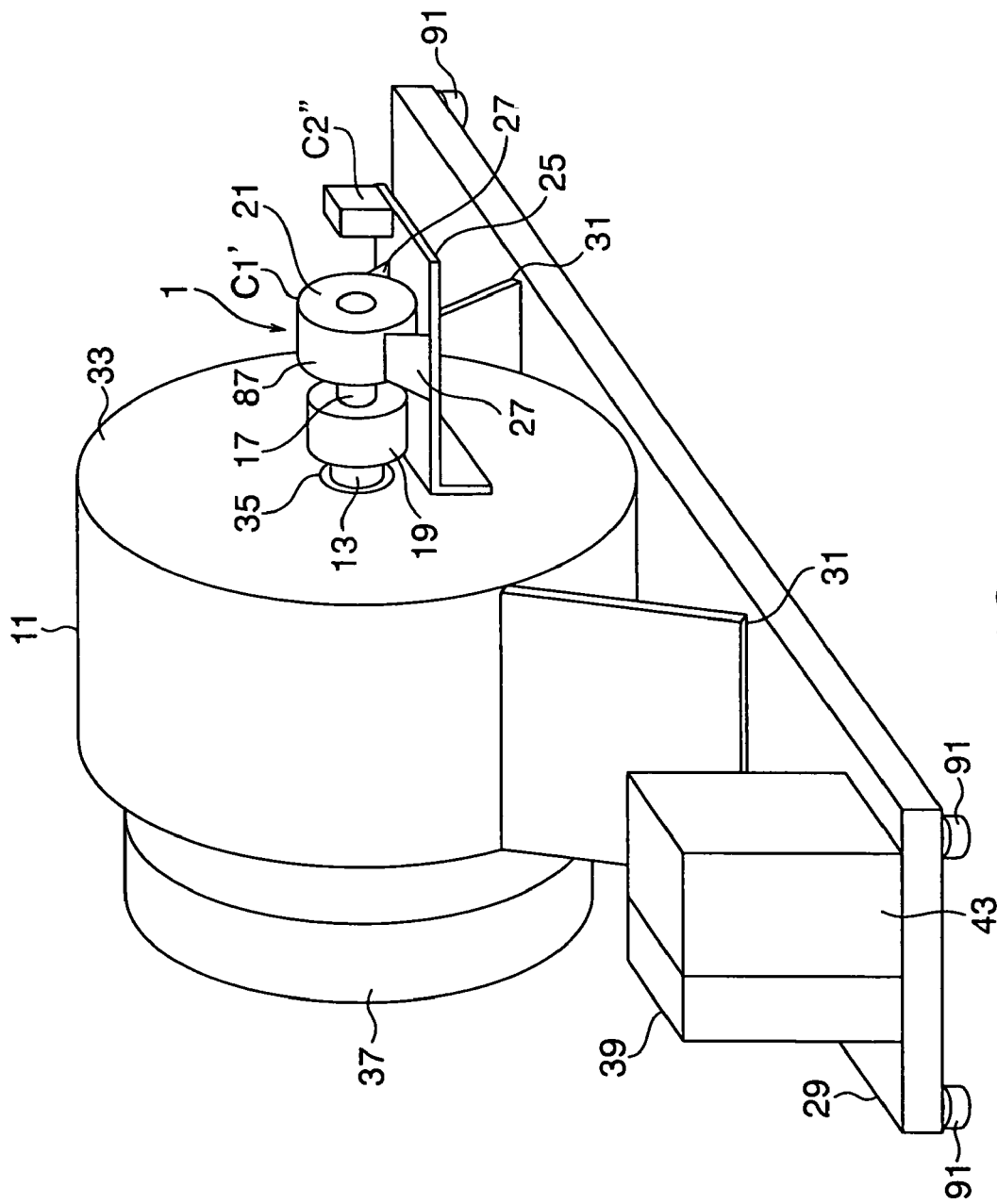
FIG. 8 is a perspective view of the overall constitution of a second embodiment of this invention.
Figure 9:
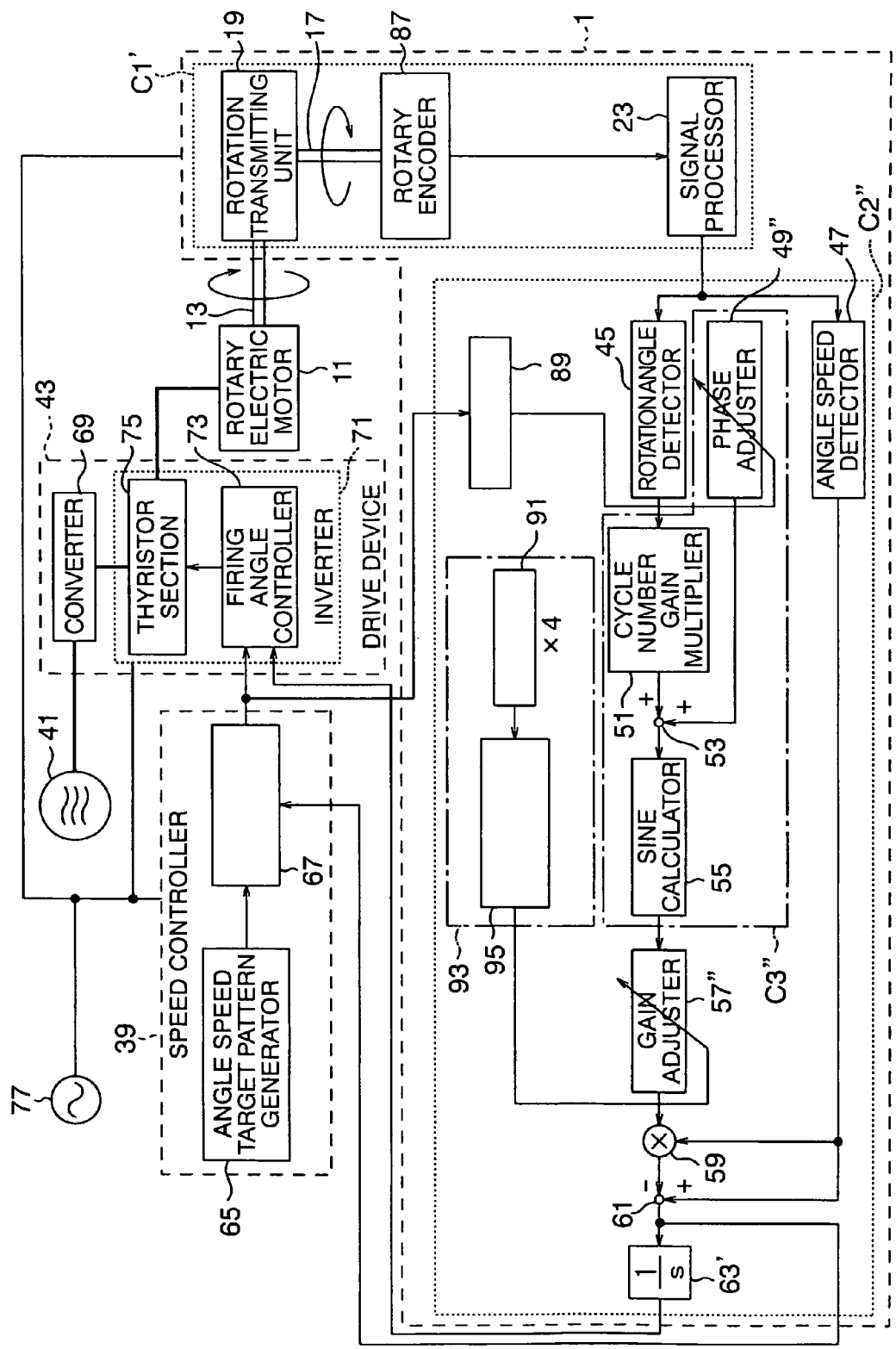
FIG. 9 is a block diagram showing the overall constitution of the second embodiment.

Subsequently, a second embodiment of this invention will be explained with reference to FIGS. 8 and 9.

In the first embodiment, the output signal of the rotary detector unit C1 is processed by the rotary calculation units C2 and C2', which are provided in series. However, there are no restrictions on the number and constitution of rotary calculation units, which may be modified in accordance with the features of the ripple component in the signal output by the rotary detector. For example, in a rotary detector unit C1' comprising a rotary encoder 87 instead of the j15, there is no second ripple component caused by the j15. On the other hand, when there is backlash in the rotation transmitting unit 19 comprising a coupling, the adjust phase fluctuates in accordance with the torque direction of the rotary electric motor 11. When the negative load of the rotary electric motor 11 exerts an external force against the rotor rotating axis 13 in a direction warping the axis core, deviation in compliance with the size of the negative load occurs between the axis core of the rotor rotating axis 13 and the axis core of the j17 connected to an unillustrated rotating axis of the rotary encoder 87, whereby the amplitude of the ripple component fluctuates. In such a case, a rotary calculator unit C2" should be used which comprises a phase adjuster 49" capable of changing the adjust phase value by using positive and negative codes of the output of the torque command calculator 67, and a gain adjuster 57" capable of detecting the external force in the warp direction of the axis core and changing the supplementary gain by a corresponding amount. FIGS. 8 and 9 shows an example of such an embodiment.

The rotary calculator unit C2" comprises a phase adjuster 49", a gain adjuster 57", and a code determining unit 89 which inputs the signal from the torque command calculator 67 and determines whether it is negative or positive. The code determining unit 89 outputs to the phase adjuster 49", which outputs predetermined initial phase values based on whether the output of the torque command calculator 67 is positive or negative. When an external force in the gravitational direction warps the axis core of the rotor rotating axis 13, the gain of the gain adjuster 57" is increased or reduced based on the output of an external force detecting unit 93, and the gain is adjusted to a value equal to the amplitude of the first ripple component described above. The external force detecting unit 93 comprises four load cells 91, which are provided between an unillustrated floor surface and the four corners of the base 29 and output voltage signals in accordance with the force in the gravitational direction, and an external force calculator unit 95 which calculates the external force in the gravitational direction from the outputs of the load cells 91; the external force calculator unit 95 outputs a calculation of the external force. That is, no matter what the operating environment of the rotary detector 1, the code determining unit 89 and the external force detecting unit 93 ensure that the error err in Equation (8) is zero. The gain of the cycle number gain multiplier 51 in the rotary calculator unit C2" is of course set to 1. In this embodiment, the trigonometrical calculation unit C3" comprises the phase adjuster 49", the cycle number gain multiplier 51, the adder 53, and the sine calculator 55.

Embodiment 3

Figure 10:
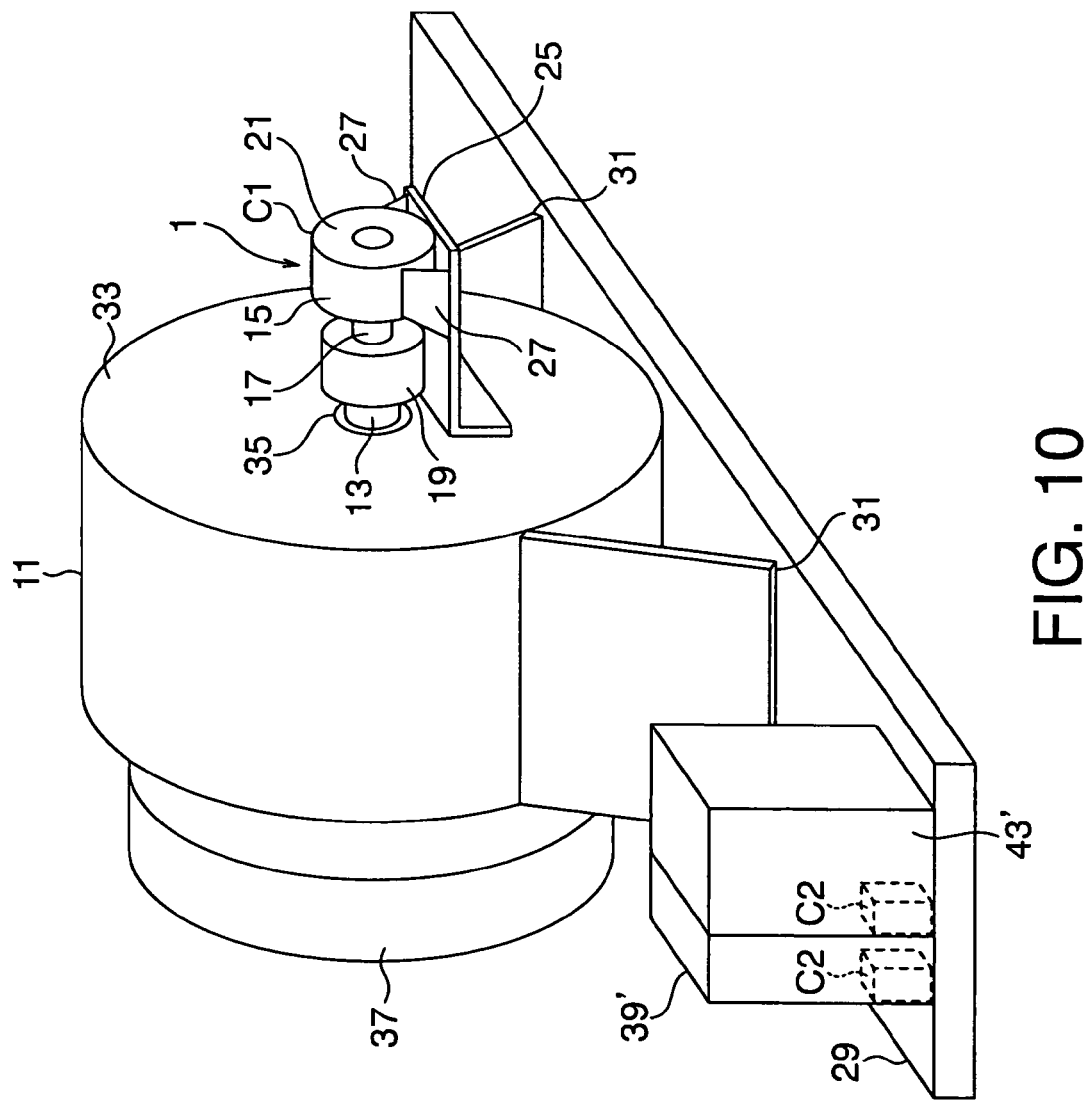
FIG. 10 is a perspective view of the overall constitution of a third embodiment of this invention.
Figure 11:
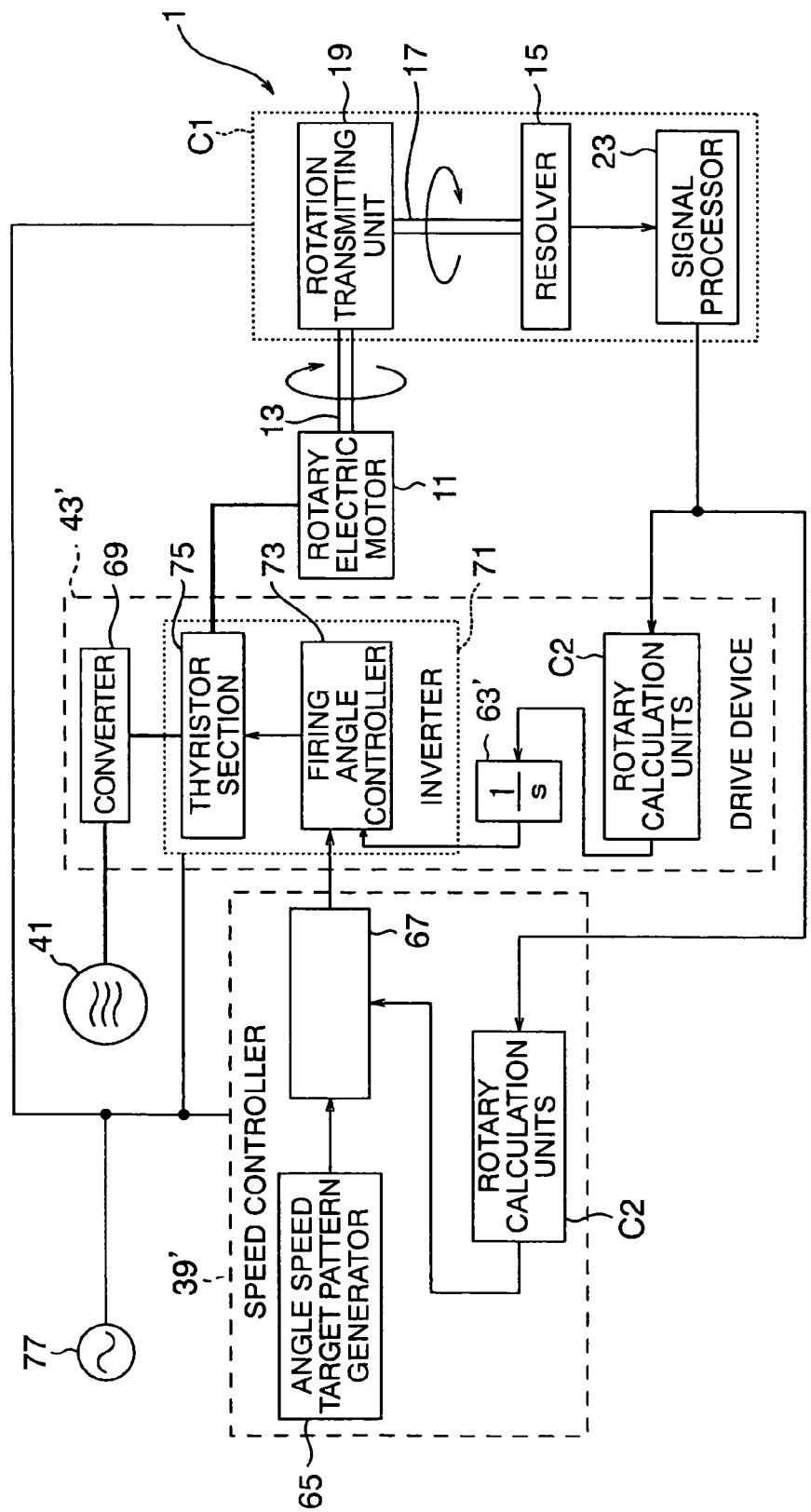
FIG. 11 is a block diagram showing the overall constitution of the third embodiment.

A third embodiment of this invention will be explained with reference to FIGS. 10 and 11.

In the first and second embodiments, the rotary detection units (C1 and C1') are adjacent to the rotary calculation units (C2, C2', and C2"), and together form the overall rotary detector 1, but there are no restrictions on the distance and positions of the rotary detection units and rotary calculation units. As shown in FIGS. 10 and 11, the rotary calculator unit C2 may be incorporated in the speed control device 39 and the drive device 43. Since the drive device 43' requires rotation angle information, the output of the rotary calculator unit C2 is input via the integrator 63' to the firing angle controller 73. The rotary calculator unit C2' is not used here, since the first ripple component caused by the rotary transmitting unit is negligible. In this embodiment, the rotary detector unit C1 may be installed in the rotary electric motor 11, achieving an advantage of simple installation.

In the embodiments described above, the rotary calculation units C2, C2', and C2" are analog calculation systems, but the constitution is not restricted to analog calculation and digital calculation is acceptable.

In the embodiments described above, the detected device is a rotary electric motor, but there are no restrictions on the device detected by the rotary detector. For example, the detected device may be a rotor, a power generator, a linear motor which uses a rotary encoder to convert a linear distance moved by a movable element via wheels to a rotation angle.

In addition to the above, various other modifications may be made within the scope of the invention.

As described above, according to the rotary detector of this invention, the ripple component in an output signal caused by the rotary detector itself can be greatly reduced, making it possible to reduce torque ripples of an electric motor and various types of actuators, generated by the rotation angle detector unit, and to increase the control performance of these actuators.

Further, since the torque ripple caused by the rotary detector unit can be eliminated, it becomes easier to identify the causes of torque ripples caused by other factors.

Further, since the output ripples of the rotary detector unit can be determined by a simple calculation, the drive and control devices of the actuator can be simplified and their cost can be reduced.

Moreover, since the ripple component can be reduced irrespective of the rotating speed of the detected device, the precision and reliability of the rotary detector unit can be increased.

What is claimed is:

1. A rotary detector comprising:
   a rotary detector unit which detects rotary motion of a rotor; and
   a rotary calculator unit comprising a rotation angle detector, which detects a rotation angle of said rotor, and an angle speed detector which detects an angle speed of said rotor, based on an output of said rotary detector unit;
   said rotary calculator unit comprising:
   a trigonometrical calculator which calculates a sine value or a cosine value of the rotation angle detected by said rotary detector;
   a gain adjuster which multiplies the sine value or the cosine value, calculated by said trigonometrical calculator, by a predetermined gain;
   a multiplier which multiplies an output of said gain adjuster by an output of said angle speed detector; and
   a subtracter which subtracts an output of said multiplier from the output of said angle speed detector.

2. The rotary detector as described in claim 1, said trigonometrical calculator comprising a phase adjuster which adjusts a phase of the rotation angle, detected by said rotation angle detector.

3. The rotary detector as described in claim 2, said rotary calculator unit calculating an angle speed $\omega_{out}$ by calculating $\omega_{out}=(1-G\cdot\sin(n\theta+\Psi)$
   where $\theta$ represents the rotation angle, G represents the gain of the gain adjuster, $\Psi$ represents an adjust phase value of the phase adjuster, and n represents a number of ripple cycles in the output of said rotary angle detector in one rotation of said rotor.

4. The rotary detector as described in claim 2, said phase adjuster having a plurality of adjust phase values, and selectively outputting one of said plurality of adjust phase values in accordance with a torque code of said rotor.

5. The rotary detector as described in claim 1, said rotary detector unit comprising a resolver which creates an output in accordance with the rotation angle of said rotor.

6. The rotary detector as described in claim 1, said rotary detector unit comprising a generator which outputs a voltage in accordance with the angle speed of said rotor.

7. The rotary detector as described in claim 1, said rotary detector unit comprising an encoder which creates an output in accordance with the rotation angle of said rotor.

8. The rotary detector as described in claim 1, said rotary detector unit being provided separately from said rotary calculator unit.

9. The rotary detector as described in claim 1, said rotary detector unit housing said rotary calculator unit.

10. The rotary detector as described in claim 1, said rotary calculator unit comprising a unit for reducing a ripple component of said angle speed.

11. The rotary detector as described in claim 1, said rotary calculator unit comprising a unit for reducing a ripple component of said rotation angle.

12. The rotary detector as described in claim 1, said rotation angle detector comprising an integrator which obtains a rotation angle by integrating an output of said angle speed detector.

13. The rotary detector as described in claim 1, said rotary calculation unit comprising an integrator for integrating said angle speed output $\omega_{out}$.

14. The rotary detector as described in claim 1, said rotary calculator unit outputting a rotation angle signal which reduces a ripple component of said rotation angle, and an angle speed signal which reduces a ripple component of said angle speed.

15. The rotary detector as described in claim 1, said rotary calculator unit being provided in series in a plurality of levels.

16. The rotary detector as described in claim 1, said gain adjuster varying said predetermined gain in accordance with an external force in the gravitational direction acting on rotor rotation axis of said rotor.

* * * * *